No. 831,423. PATENTED SEPT. 18, 1906.
E. F. FISHER.
NEST.
APPLICATION FILED OCT. 19, 1905.

Witnesses
Frank B. Hoffman.
A. M. Laugley

Inventor
E. F. Fisher
By Victor J. Evans
Attorney

THE NORRIS PETERS CO., WASHINGTON, D. C.

UNITED STATES PATENT OFFICE.

EDWARD FREEMAN FISHER, OF ATKINSON, NEBRASKA.

NEST.

No. 831,423.  Specification of Letters Patent.  Patented Sept. 18, 1906.

Application filed October 19, 1905. Serial No. 283,510.

*To all whom it may concern:*

Be it known that I, EDWARD FREEMAN FISHER, a citizen of the United States, residing at Atkinson, in the county of Holt and State of Nebraska, have invented new and useful Improvements in Nests, of which the following is a specification.

The invention relates to an improvement in nests comprehending specifically a single structure providing one nest readily adapted for ventilation and cleansing.

The main object of the invention is the production of a nest molded from suitable plastic material and medicated against vermin, the structure being provided with suitable ventilating and drainage openings.

The invention will be described in the following specification, reference being had to the accompanying drawings, in which—

Figure 1:
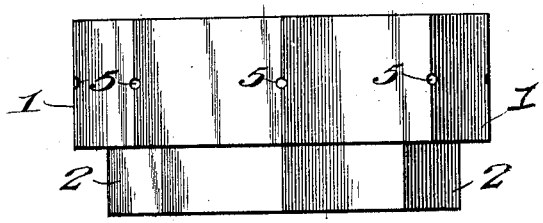
Figure 2:
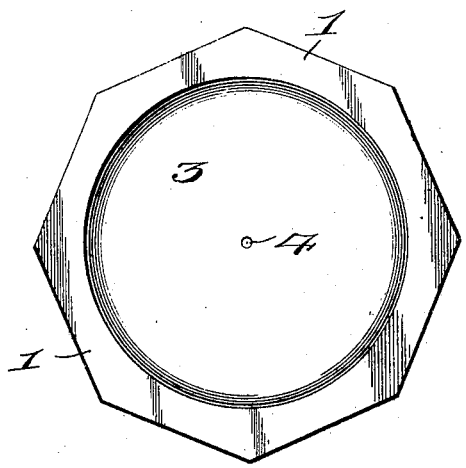
Figure 3:
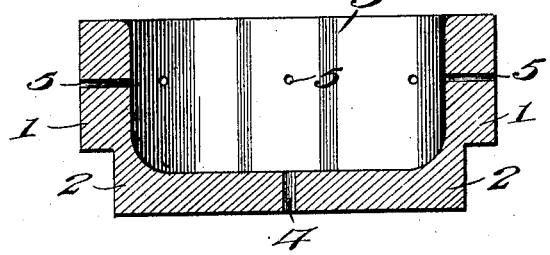

Figure 1 is a view in side elevation of a nest constructed in accordance with my invention. Fig. 2 is a plan view of the same. Fig. 3 is a vertical cross-section of the same.

Referring to the drawings, my improved nest comprises a body 1, formed of plastic material, the lower portion of which is reduced to provide a base 2. The upper portion of the body is formed with a depression 3, forming the nest proper. The depression is preferably formed with straight sides and a flat bottom approximately at right angles to the sides, as clearly shown in Fig. 3. The depression 3 is in communication with a channel 4, leading from the lowest point of the depression vertically through the base and with lateral depressions 5, leading through the side walls of the body.

The channels 5 are preferably arranged in a concentric series, as indicated in Fig. 2, and are horizontally arranged, communicating with the depression about centrally of its height.

The channel 4 provides a drain-opening through the use of which the nest depression may be kept dry, this opening also permitting the escape of water introduced into the nest depression for the purpose of cleansing the same. By preference the lower end of the channel is partially closed by a suitable plug, providing at all times for the escape of any water accumulating in the nest and permitting a free vent to the cleansing-water when desired by the removal of the plug.

The channels 5 provide for ventilating the nest depression, and, owing to their arrangement in a concentric series about centrally the height of said depression, the latter is thoroughly ventilated at all times.

The nest as a whole is molded from suitable plastic material, one ingredient of which is any of the well-known medications which will serve to render the nest vermin-proof.

Owing to the manner of forming the nest the cost of manufacture is materially reduced when compared with other nests now in use; but the main characteristic of the nest constructed in accordance with my invention is that the material composing the same will retain the temperature of the body of the fowl for a considerable time after the hen is off the nest, thus increasing the total hatch of the eggs. The construction and material of the nest prevent all foulness, and it may readily be cleaned at any time.

Having thus described the invention, what I claim is—

1. A nest molded from plastic material and comprising a body and a reduced base, the nest depression opening from the body and extending in the base.

2. A nest molded from plastic material and comprising a body and a base, the body surrounding the nest depression being formed with a series of ventilating-openings to establish communication between said depression and the atmosphere, whereby to ventilate the nest when the same is in use.

3. A nest comprising a body molded from plastic material containing a medicant insecticide as an ingredient.

4. A nest comprising a body molded from plastic material, the wall of the body surrounding the nest depression being formed with a plurality of ventilating-openings to establish communication between the nest depression and the atmosphere, the base of the nest being formed with an outlet communicating with the lowest point of the nest depression.

In testimony whereof I affix my signature in presence of two witnesses.

EDWARD FREEMAN FISHER.

Witnesses:
 EDWARD J. KILMUNY,
 THOMAS KELLEY.